(12) United States Patent
Gokhale et al.

(10) Patent No.: US 8,412,680 B1
(45) Date of Patent: Apr. 2, 2013

(54) SYSTEM AND METHOD FOR PERFORMING BACKUP OPERATIONS AND REPORTING THE RESULTS THEREOF

(75) Inventors: Parag Gokhale, Marlboro, NJ (US); Amey Vijaykumar Karandikar, Long Branch, NJ (US)

(73) Assignee: CommVault Systems, Inc, Oceanport, NJ (US)

( * ) Notice: Subject to any disclaimer, the term of this patent is extended or adjusted under 35 U.S.C. 154(b) by 119 days.

(21) Appl. No.: 13/010,734

(22) Filed: Jan. 20, 2011

(51) Int. Cl.
*G06F 17/30* (2006.01)
(52) U.S. Cl. ........................................... 707/654
(58) Field of Classification Search ............... 707/640, 707/653, 654, 648; 711/162
See application file for complete search history.

(56) References Cited

U.S. PATENT DOCUMENTS

| | | | | |
|---|---|---|---|---|
| 6,064,880 A * | 5/2000 | Alanara | ........................ | 455/419 |
| 6,728,711 B2 * | 4/2004 | Richard | ............................... | 1/1 |
| 7,752,487 B1 * | 7/2010 | Feeser et al. | ................. | 714/4.11 |
| 7,882,073 B1 * | 2/2011 | Ojalvo | .......................... | 707/654 |
| 8,190,833 B2 * | 5/2012 | Takaki | .......................... | 711/158 |
| 2002/0065999 A1 * | 5/2002 | Kikuchi et al. | ............... | 711/162 |
| 2002/0144069 A1 * | 10/2002 | Arakawa et al. | ............... | 711/162 |
| 2005/0005194 A1 * | 1/2005 | Scanlan et al. | .................. | 714/13 |
| 2005/0015662 A1 * | 1/2005 | Scanlan | .......................... | 714/13 |
| 2007/0061385 A1 * | 3/2007 | Clark et al. | .................... | 707/204 |
| 2008/0126445 A1 * | 5/2008 | Michelman | .................... | 707/204 |
| 2009/0125692 A1 * | 5/2009 | Yamamoto et al. | ........... | 711/162 |
| 2011/0041004 A1 * | 2/2011 | Miwa et al. | ...................... | 714/5 |
| 2011/0137865 A1 * | 6/2011 | Shin et al. | ..................... | 707/648 |
| 2012/0120078 A1 * | 5/2012 | Hubbard | .................... | 345/440.2 |

* cited by examiner

*Primary Examiner* — Cam-Linh Nguyen
(74) *Attorney, Agent, or Firm* — Sheppard Mullin Richter & Hampton LLP (57) ABSTRACT

Systems and methods are provided for performing a plurality of data operations as a batch process on a client computing device and then reporting on the results of the batch process. According to some embodiments, the batch process is a backup process, a backup server or backup client is provided that is configured to perform the backup process on the backup client; record a backup operation result for the backup operations performed as part of the backup process; and determine a backup process result based on the one or more backup operation results, wherein if no backup operation result indicates a failure, then the backup process result is determined to be a success, and wherein if a backup operation result indicates a failure, then the backup process result is determined to be a success if the plurality of backup operation results meets a predetermined level of success.

25 Claims, 4 Drawing Sheets

SYSTEM AND METHOD FOR PERFORMING BACKUP OPERATIONS AND REPORTING THE RESULTS THEREOF

TECHNICAL FIELD

The present invention generally relates to data storage, and more particularly, some embodiments relate to systems and methods for performing batch data operations, such as data management and data replication, and reporting on such batch data operations.

DESCRIPTION OF THE RELATED ART

The storage and retrieval of data is an age-old art that has evolved as methods for processing and using data have evolved. In the early $18^{th}$ century, Basile Bouchon is purported to have used a perforated paper loop to store patterns used for printing cloth. In the mechanical arts, similar technology in the form of punch cards and punch tape were used in the $18^{th}$ century in textile mills to control mechanized looms. Two centuries later, early computers also used punch cards and paper punch tape to store data and to input programs.

However, punch cards were not the only storage mechanism available in the mid $20^{th}$ century. Drum memory was widely used in the 1950s and 1960s with capacities approaching about 10 kb, and the first hard drive was developed in the 1950s and is reported to have used 50 24-inch discs to achieve a total capacity of almost 5 MB. These were large and costly systems and although punch cards were inconvenient, their lower cost contributed to their longevity as a viable alternative.

In 1980, the hard drive broke the 1 GB capacity mark with the introduction of the IBM 3380, which could store more than two gigabytes of data. The IBM 3380, however, was about as large as a refrigerator, weighed ¼ ton, and cost between approximately $97,000 to $142,000, depending on features selected. In contrast, contemporary storage systems now provide storage for hundreds of terabytes of data, or more, for seemingly instantaneous access by networked devices. Even handheld electronic devices such as digital cameras, MP3 players and others are capable of storing gigabytes of data, and modern desktop computers boast gigabytes or terabytes of storage capacity.

With the advent of networked computing, storage of electronic data has also expanded from the individual computer to network-accessible storage devices. These include, for example, optical libraries, Redundant Arrays of Inexpensive Disks (RAID), CD-ROM jukeboxes, drive pools and other mass storage technologies. These storage devices are accessible to and can be shared by individual computers using such traditional networks as Local Area Networks (LANs) and Wide Area Networks (WANs), or using Storage Area Networks (SANs). These client computers not only access their own local storage devices but also network storage devices to perform backups, transaction processing, file sharing, and other storage-related operations.

With respect to performing backups, several approaches involve creating a local copy of the data sought to be protected/preserved, or replicating the data on one or more external storage devices, preferably storage devices on a network. To implement these and other types of backup solutions, various backup architectures deploy backup software to the backup client, to the server, or both in order to facilitate backup operations. Generally, the software is set to perform the backup process (also referred to as a backup job) by performing a plurality of backup operations on a predetermined set of data (e.g., files on a particular storage device, files within a specific directory, or files of a specific type), and perform such backup operations automatically based on a set schedule (e.g., hourly, daily, weekly, etc.) in an attempt to protect/preserve the most recent data. When performing backup operations on a set of data, it is customary for the backup software to maintain a log or generate a report on details regarding the backup operations performed, especially when the operations are being performed as part of an automated backup process. Typically, such a log or report will disclose details regarding the specific performance and success of the backup process. For example, the details may disclose such information as what data has been operated upon, when a specific backup operation was performed, what data operations were involved in a backup operation, what the result was for a specific backup operation (e.g., success in performing a backup of a specific file or directory), or any occurrences of errors during performance of a backup operation.

BRIEF SUMMARY OF EMBODIMENTS OF THE INVENTION

According to various embodiments, systems and methods are provided for performing a plurality of data operations on a computing device and, more particularly, performing the plurality of data operations as part of a batch process on a client computing device and then reporting on the results of the batch process. For some of these embodiments, the batch process comprises a plurality of data operations to be performed, and may be administered/controlled from a central computing device, such as a server. By administering/controlling the batch process by way of a central computing device, the batch processes can be administered to two or more backup clients simultaneously (e.g., thousands to tens of thousands of data clients), and receives batch process results from each of the two or more backup clients. For some embodiments, the batch process is a backup process comprising one or more backup operations. Accordingly, in such embodiments, the data operations performed on a computing device are those of a backup process (i.e., backup operations), and results in a report indicating the overall results of the backup process (e.g. success, failure, failure, error, or warning).

According to one embodiment, a backup server configured to administer a backup process on a backup client is provided, comprising: a processor; a memory connected to the processor; and a non-transitory computer readable medium having instructions embedded therein, the instructions configured to cause the processor to perform the operations of: performing the backup process on the backup client, wherein the backup process comprises performing a plurality of backup operations on data residing on the backup client; receiving a backup operation result for each of at least two backup operations of the plurality of backup operations performed to produce at least two corresponding backup operation results within a plurality of backup operation results, wherein each backup operation result indicates a success or failure for a corresponding backup operation; and determining a backup process result based on the at least two corresponding backup operation results, wherein if no backup operation result of the plurality of backup operation results indicates a failure, then the backup process result is determined to be a success, and wherein if a backup operation result of the plurality of backup operation results indicates a failure, then the backup process result is determined to be a success if the plurality of backup operation results meets a predetermined level of success.

In some embodiments, the backup server performs the backup process by sending a remote instruction to the backup client to perform the backup process, comprising the backup client performing the plurality of backup operations on the data in response to the remote instruction. In some such embodiments, the backup server may receive the backup operation result from the backup client, or may itself record the backup operation result. For example, in some embodiments, once backup server has instructed the backup client to perform the backup process on the data, the backup client locally invokes the backup process, performs the backup operations for the backup process, and where the backup client is backing up the data to the backup server, the backup server would record the backup operation results as they are performed. In a further example, once backup server has instructed the backup client to perform the backup process on the data, the backup client locally invokes the backup process, performs the backup operations for the backup process, and reports the backup operation results to the backup server.

In other embodiments, the backup server performs the backup process by performing the plurality of backup operations on its own, and records the backup operation result itself. For example, the backup server may have access to the backup client's data via a network) and the backup server will perform the backup operations on the remote data on its own.

In further embodiments, a backup client is provided, comprising: a processor; a memory connected to the processor; and a non-transitory computer readable medium having instructions embedded therein, the instructions configured to cause the processor to perform operations of: receiving a remote instruction from a backup server to perform a backup process on the backup client, wherein the backup process comprises performing a plurality of backup operations on data residing on the backup client; recording a backup operation result for each of at least two backup operations of the plurality of backup operations performed to produce at least two corresponding backup operation results within a plurality of backup operation results, wherein each backup operation result indicates a success or failure for a corresponding backup operation; and transmitting the plurality of backup operations results to the backup server, wherein the backup server is configured to determining a backup process result based on the at least two corresponding backup operation results, wherein if no backup operation result of the plurality of backup operation results indicates a failure, then the backup process result is determined to be a success, and wherein if a backup operation result of the plurality of backup operation results indicates a failure, then the backup process result is determined to be a success if the plurality of backup operation results meets a predetermined level of success. Such a backup client embodiment may, for example, operate in conjunction with backup servers in accordance with some embodiments of the present invention.

For example, some such embodiments may be implemented, for example, where backup software is deployed on both a server computing device and a client computing device, and the server-side backup software administrates (i.e., controls) the backup process on the client computing device via the client-side backup software. The client-side backup software, in turn, performs the actual backup operations. Depending on the embodiment, the client-side backup software may backup data locally at the client computing device (e.g., to an internally or externally attached, local storage device), remotely to the server computing device, or remotely to another data storage unit (e.g., Network Attached Storage (NAS) device, Storage Area Network (SAN) storage device, or another server).

Depending on the embodiment, the data operated upon may take the form of a file, a database or some other data structure. Additionally, depending on the embodiment, a backup operation may be regarded as a failure under a variety of conditions, including when the backup operation causes an error or the backup operation fails to ever be attempted.

Alternatively, in some embodiments, a backup client is provided, comprising: a processor; a memory connected to the processor; and a non-transitory computer readable medium having instructions embedded therein, the instructions configured to cause the processor to perform operations of: performing a backup process on the backup client, wherein the backup process comprises performing a plurality of backup operations on data residing on the backup client; recording a backup operation result for each of at least two backup operations of the plurality of backup operations performed to produce at least two corresponding backup operation results within a plurality of backup operation results, wherein each backup operation result indicates a success or failure for a corresponding backup operation; and determining a backup process result based on the at least two corresponding backup operation results, wherein if no backup operation result of the plurality of backup operation results indicates a failure, then the backup process result is determined to be a success, and wherein if a backup operation result of the plurality of backup operation results indicates a failure, then the backup process result is determined to be a success if the plurality of backup operation results meets a predetermined level of success. Such embodiments include, for example, where backup software is deployed and operated locally at the client computing device (e.g., client desktop computer), and does not involve a server.

In additional embodiments, the instructions are further configured to cause the processor to prompt a user to assign a weight value to a performed backup operation corresponding to a backup operation result that indicates a failure, wherein the weight value signifies the performed backup operation's criticality to the backup process, and the weight value contributes to the predetermined level of success for the backup process or a subsequent backup process. Additionally, in some such embodiments, the instructions are further configured to cause the processor to perform the operations of: receiving from the user the weight value assigned to the performed backup operation; and creating a reporting rule that assigns the weight value to the performed backup operation. Depending on the embodiment, the user may be prompted when the batch process result is determined to be a failure, when the performed backup operation is determined to be a failure, or when the performed backup operation is determined to be a failure and the performed backup operation lacks a weight value.

In some embodiments, the predetermined level of success is defined by a reporting rule that assigns a weight value to a backup operation, the weight value signifying the backup operation's criticality to the backup process and contributing to the predetermined level of success for the backup process or a subsequent backup process. The backup reporting rule assigns the weight value to a backup operation according to a type of backup operation, a type of content within the data, or an identity of the backup client.

With respect to the predetermined level of success, in some embodiment, it may be defined by a threshold percentage of backup operations successfully or unsuccessfully performed, or a threshold percentage of critical backup operations successfully or unsuccessfully performed.

Though some embodiments described herein are generally directed toward performing a backup process on a computing device, other embodiments may be implemented for other forms of batch jobs involving a plurality of data operations (e.g., transfers of data, purging of sensitive data, analysis of data, etc.).

In various other embodiments, some or all of the features described herein may be implemented into systems, methods, or computer program products that are in accordance with the present invention. Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following Figure. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The Figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF EMBODIMENTS
OF THE INVENTION

The present invention relates to performing a plurality of data operations on a computing device and, more particularly, performing the plurality of data operations as a batch process on a client computing device and then reporting on the results of the batch process.

Before describing the invention in detail, it is useful to describe a few example environments with which the invention can be implemented. The systems and methods described herein can be implemented using a number of different storage architectures. One such exemplary storage architecture is described with reference to FIG. 1. As shown in this example, storage operation cell 50 may generally include a storage manager 100, a data agent 95, a media agent 105, and a storage device 115. The storage operation cell 50 may also include components such as a client 85, a data or information store 90, databases 110 and 111, jobs agent 120, an interface module 125, and a management agent 130. Each media agent 105 may control one or Input/Output (I/O) devices such as a Host Bus Adaptor (NBA) or other communications link for transferring data from client 85 to storage devices 115. Such a system and elements thereof are exemplary of a modular backup system such as the CommVault® QiNetix system, and also the CommVault GALAXY® backup system, available from CommVault® Systems, Inc. of Oceanport, N.J., and further described in U.S. Pat. Nos. 7,035,880 and 7,620,710 each of which is incorporated herein by reference in its entirety.

Figure 1:
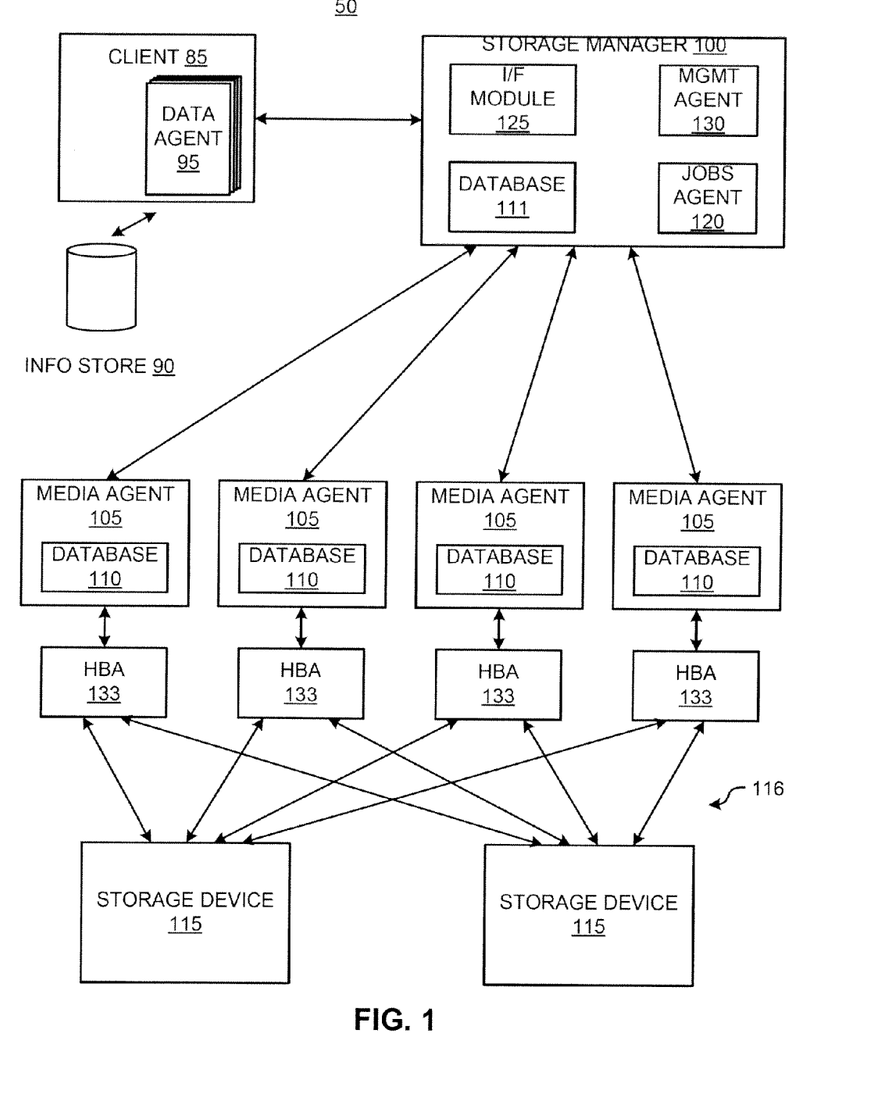
FIG. 1 depicts examples of data storage algorithms and architectures that can be used in conjunction with the systems and methods described herein.

A storage operation cell, such as cell 50, may generally include combinations of hardware and software components associated with performing storage operations on electronic data. Exemplary storage operation cells according to embodiments of the invention may include, CommCells as embodied in the QNet storage management system and the QiNetix storage management system by CommVault® Systems of Oceanport, N.J. According to some embodiments of the invention, storage operation cell 50 may be related to backup cells and provide some or all of the functionality of backup cells as described in U.S. Pat. No. 7,395,282, which is also incorporated by reference in its entirety. It should be noted, however, that in certain embodiments, storage operation cells may perform additional types of storage operations and other types of storage management functions that are not generally offered by backup cells.

In accordance with certain embodiments additional storage operations performed by storage operation cells may include creating, storing, retrieving, and migrating primary data copies and secondary data copies (which may include, for example, snapshot copies, backup copies, Hierarchical Storage Management (HSM) copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy is generally a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy may be stored to a storage manager database 111, to archive media as metadata for use in restore operations or other storage operations, or to other locations or components of the system.

A schedule policy can be used to specify when to perform storage operations and how often and may also specify performing certain storage operations on sub-clients of data and how to treat those sub-clients. A sub-client may represent static or dynamic associations of portions of data of a volume and are typically mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc. Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell 50 may contain the same or similar physical components, however, it may be configured to perform Storage Resource Management (SRM) operations, such as monitoring a primary data copy or performing other known SRM operations.

Thus, as can be seen from the above, although the first and second storage operation cells are logically distinct entities configured to perform different management functions (e.g., HSM and SRM respectively), each cell may contain the same or similar physical devices in both storage operation cells. Alternatively, in other embodiments, different storage operation cells may contain some of the same physical devices and not others. For example, a storage operation cell 50 configured to perform SRM tasks may contain a media agent 105, client 85, or other network device connected to a primary storage volume, while a storage operation cell 50 configured to perform HSM tasks may instead include a media agent 105, client 85, or other network device connected to a secondary storage volume and not contain the elements or components associated with and including the primary storage volume. These two cells, however, may each include a different storage manager 100 that coordinates storage operations via the same media agents 105 and storage devices 115. This "overlapping" configuration allows storage resources to be accessed by more than one storage manager 100 such that multiple paths exist to each storage device 115 facilitating failover, load balancing and promoting robust data access via alternative routes.

Alternatively, in some embodiments, the same storage manager 100 may control two or more cells 50 (whether or not each storage cell 50 has its own dedicated storage manager 100). Moreover, in certain embodiments, the extent or type of overlap may be user-defined (through a control console (not shown)) or may be automatically configured to optimize data storage and/or retrieval.

Data agent 95 may be a software module or part of a software module that is generally responsible for archiving, migrating, and recovering data from client computer 85 stored in an information store 90 or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Generally speaking, storage manager 100 may be a module that coordinates and controls storage operations performed by storage operation cell 50. Storage manager 100 may communicate with some or all elements of storage operation cell 50 including client computers 85, data agents 95, media agents 105, and storage devices 115, to initiate and manage system backups, migrations, and data recovery.

Storage manager 100 may include a jobs agent 120 that monitors the status of some or all storage operations previously performed, currently being performed, or scheduled to be performed by storage operation cell 50. Jobs agent 120 may be communicatively coupled with an interface module 125. Interface module 125 may include information processing and display software, such as a graphical user interface (GUI), an application program interface (API), or other interactive interface through which users and system processes can retrieve information about the status of storage operations. Through interface module 125, users may issue instructions to various storage operation cells 50 regarding performance of the storage operations as described. For example, a user may employ the GUI to view the status of pending storage operations in some or all of the storage operation cells in a given network or to monitor the status of certain components in a particular storage operation cell (e.g., the amount of storage capacity left in a particular storage device).

Storage manager module 100 may also include a management agent 130 that is typically implemented as a software module or application program. In general, management agent 130 provides an interface that allows various management components 100 in other storage operation cells 50 to communicate with one another. For example, assume a certain network configuration includes multiple cells 50 adjacent to one another or otherwise logically related in a WAN or LAN configuration (not shown). With this arrangement, each cell 50 may be connected to the other through each respective interface module 125. This allows each cell 50 to send and receive certain pertinent information from other cells 50 including status information, routing information, information regarding capacity and utilization, etc. These communication paths may also be used to convey information and instructions regarding storage operations.

For example, a management agent 130 in first storage operation cell 50 may communicate with a management agent 130 in a second storage operation cell 50 regarding the status of storage operations in the second storage operation cell. Another illustrative example includes the case where a management agent 130 in first storage operation cell 50 communicates with a management agent 130 in a second storage operation cell to control the storage manager 100 (and other components) of the second storage operation cell via the management agent 130 contained in the storage manager 100.

Another illustrative example is the case where management agent 130 in the first storage operation cell 50 communicates directly with and controls the components in the second storage management cell 50 and bypasses the storage manager 100 in the second storage management cell. If desired, storage operation cells 50 can also be organized hierarchically such that hierarchically superior cells control or pass information to hierarchically subordinate cells or vice versa.

Storage manager 100 may also maintain an index cache, a database, or other data structure (not pictured) that can be stored in storage manager database 111 or elsewhere. This data structure may be used to indicate logical associations between components of the system, user preferences, management tasks, some SRM or HSM data or other useful data. As further described herein, some of this information may be stored in a media agent database 110 or other local data store according to some embodiments. For example, the storage manager 100 may use data from database 111 to track logical associations between media agents 105 and storage devices 115.

A media agent 105 may be implemented as a module that conveys data, as directed by storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to a particular storage device 115 via one or more communication links such as HBA links 133.

Each HBA link 133 may include multiple HBA communication paths that are associated with one or more media agents 105. HBA link 133 may also communicate data from clients 85 under the supervision of media agents 105 to storage devices 115 via HBA communication paths 116, whereby each HBA link 133 may provide multiple HBA communication paths 116 between each of media agents 105 and storage devices 115. In some embodiments, HBA link 133 may be part of or associated with a storage area network "SAN") and used by various resources with storage management cell 50 to transfer data to storage devices 115. Various exemplary embodiments associated with the connectivity and communication between media agents are described in the aforementioned U.S. Pat. No. 7,620,710.

Each media agent 105 may maintain an index cache, a database, or other data structure which stores index data generated during backup, migration, and restore and other storage operations as described herein. For example, performing storage operations on Microsoft Exchange data may generate index data. Such index data provides a media agent 105 or other external device with a fast and efficient mechanism for locating data stored or backed up. This data can be stored, for example, in database 110.

Thus, in some embodiments, a storage manager database 111 may store data associating a client computer 85 with one or more media agent(s) 105, HBA link 133, and storage device(s) 115, for example, as specified in a storage policy. Media agent database 110 may include information that indicate specifically where client data is stored in storage device 115, what specific files were stored, and other information associated with storage and retrieval of data from client computer 85. In some embodiments, such index data may be stored along with the data copied to a storage device 115, with an additional copy of the index data written to index cache 110. The data in index cache 110 is thus generally readily available for use in storage operations and other activities without having to be first retrieved from the storage device 115.

In some embodiments, certain components may reside and execute on the same computer. For example, certain components may execute on a client computer 85 such as a data agent 95, a media agent 105, or a storage manager 100 which may coordinate and direct local archiving, migration, and retrieval application functions as further described in U.S. Pat. No. 7,035,880. This client computer 85 may function independently or together with other similar client computers 85.

FIG. 1 depicts examples of data storage algorithms and architectures that can be used in conjunction with the systems and methods described herein. For ease of description and to provide contextual foundation, embodiments are described herein in terms of these examples. As would be apparent to one of ordinary skill in the art after reading this description, embodiments can be implemented using these and other deduplication algorithms and architectures.

With various storage architectures a data center may be provided that includes multiple cells 50 or multiple clients 85 for a given cell 50 for data storage operations. As noted above in the example of FIG. 1, there can also be a plurality of sub-clients and agents for a data center. Various policies, such as storage policies and schedule policies (examples of which are also described above) are typically provided to set properties for or govern the operations of data storage entities such as clients, sub-clients and agents. With conventional systems, custom policies are created for each entity individually as needed or upon creation of the client. According to various embodiments of the systems and methods described herein, one or more client configuration profiles are created for a plurality of data storage entities. The client configuration profiles can comprise a template or client model that defines client properties such as, for example, client storage operation properties. Storage operation properties can include, for example, storage preferences or storage criteria such as schedule policies and storage policies. These client configuration profiles are applied to clients and client entities so that individual preferences or policies do not need to be created each time an entity (e.g., a client, sub-client or agent) is created or updated. According to another aspect, the templates can be updated from time to time and propagated to the data storage entities to update the features, characteristics or operation of the entities. Accordingly, some or all properties can be defined for groups of clients, sub-clients and agents once and propagated to those entities for application.

Figure 2A:
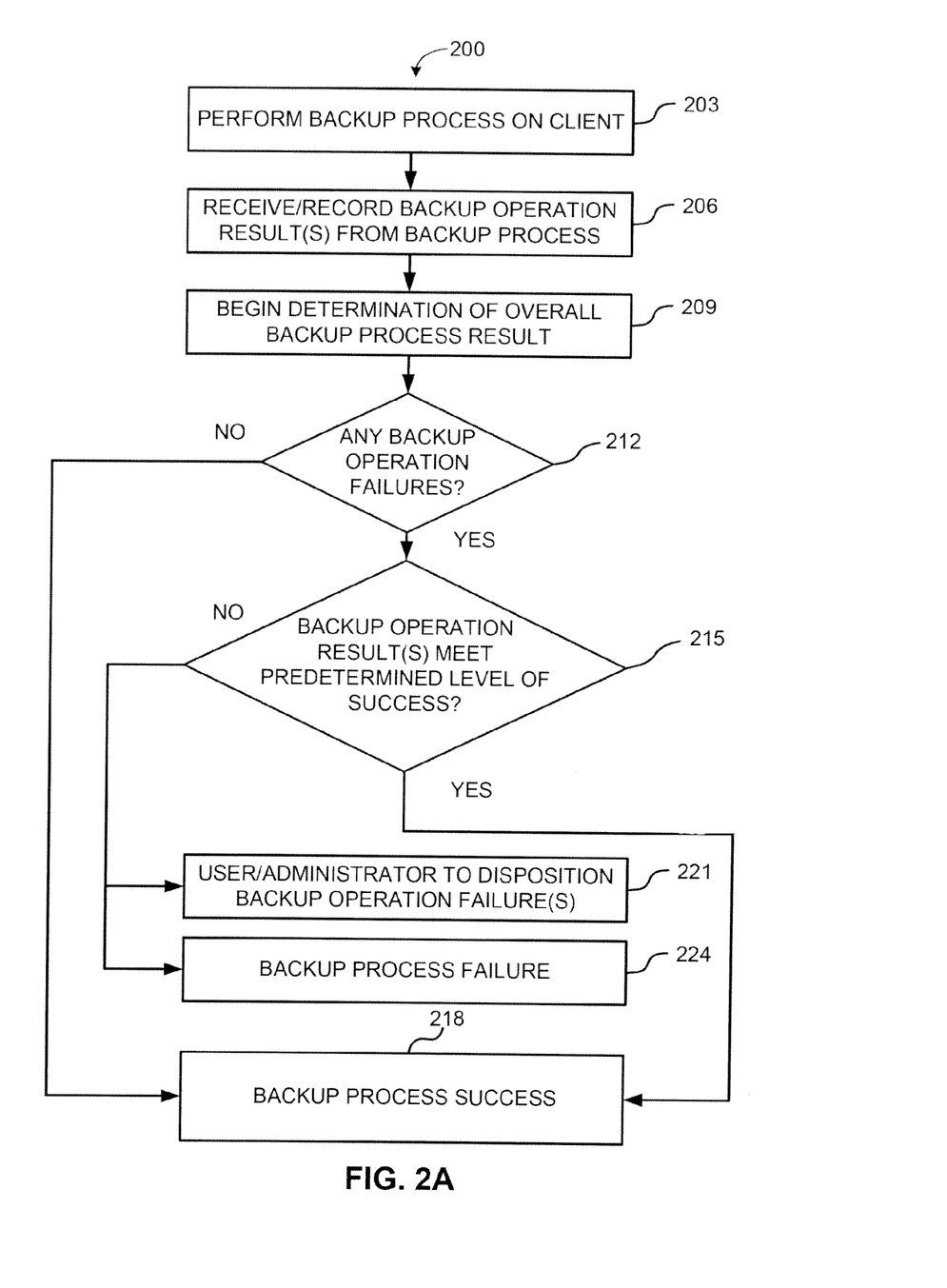
FIGS. 2A and 2B are flowcharts illustrating example methods in accordance with one embodiment of the present invention.

FIG. 2A is a flowchart illustrating an example method 200 for performing a backup process and reporting the results thereof in accordance with one embodiment of the present invention. Method 200 begins at operation 203 by performing a backup process on a client computing device (i.e., the backup client), such as client computers 85. The backup client may perform the backup process on data residing on a local storage device either internally or externally attached to the backup client. In some embodiments, the backup client may perform the backup process on data residing over a network. As noted before, the data may comprise one or more files, or one or more databases.

In embodiments where method 200 is entirely performed at the backup client (e.g., the backup process is not being administered by a backup server), the backup client may begin performing the backup process, for example, when a user or administrator manually requests/invokes the process on the backup client, or when the process is invoked automatically according to a predetermined schedule (which, for example, may be user/administrator-defined or set by a policy).

In embodiments where the backup process is being administered by a central computer, such as a backup server or storage manager 100, operation 203 may involve the central computer sending a remote instruction to the backup client to perform the backup process, and the backup client, in response to the remote instruction, performs the backup operations of the backup process on the data. In alternative embodiments, the backup server may have access to the data on the backup client, and perform the backup operations on its own over the network.

At operation 206, method 200 receives or records one or more backup operation results produced during the performance of the backup operations of the backup process. For example, where the backup client performs method 200 entirely on its own, the backup client would perform the backup operations of the backup process, and record the results of each backup operation as it is performed.

In embodiments where the backup server administers the backup process by instructing the backup client to perform the backup process, the backup client may record the backup operation results as the backup operations are performed and, subsequently, send them to the backup server for further result(s) processing. Alternatively, in further embodiments, the backup client may record the backup operation results and send them to the backup server at or near real time as the backup operations are performed by the backup client. Accordingly, the backup server can then process the backup operation results at or near real time, rather than waiting until the backup process has come to completion.

In alternative embodiments where the backup server administers the backup process by instructing the backup client to perform the backup process, after the backup client has recorded the backup operation results, the backup server may retrieve/obtain the backup operation results from the backup client on its own (e.g., where the backup server has access to the backup operation results via a network). In further such embodiments, the backup server records the backup operation results as the backup operations are performed, whether the backup server or the backup client is performing the backup operation.

Depending on the embodiment, the recording of backup operation results may occur to a file (e.g., text log), a database, or the like. Alternatively, the recording of the backup operation results may occur to another computing device, such as another server, from which the backup results can later be obtained.

Continuing with reference to FIG. 2A, at operation 209, method 200 begins determining the overall result of the backup process based on the backup the operation results received/recorded at operation 206. For example, where method 200 is being performed entirely on and by the backup client, the backup client may begin determining the overall result of the backup process based on the backup operation results recorded. In another example, where a backup server administers the backup process, after receiving the backup operation results from the backup client, the backup server may begin determining the overall results for the backup process based on the backup operation results. In yet another example, where a backup server administers the backup process, the backup client may begin and perform the determination of the overall backup process result and, then, send the determined backup result to the backup server. The backup server, in turn, may possibly combine the determined results received with the determined back process results of other backup clients.

At operation 212, method 200 analyzes whether the backup operation results of operation 206 contain any backup operation failures. For example, if a backup operation encountered an error during performance, the backup operation may indicate a failure that would subsequently be detected by method 200 at operation 212. Other example backup operation failures may include, for example, the backup operation failing to ever be attempted, the backup operation failing to gain access to the client data to be backed up, the backup operation encountering a non-fatal error, and the backup operation raising a warning. As noted before, the backup operation results may be stored within a log file or a database that a backup client or a backup server can access for further processing.

If operation 212 determines that the backup operation results of operation 206 lacks any failures, method 200 determines the backup process to be successful at operation 218. Subsequent to the successful determination, method 200 may report the backup process result or, alternatively, not report anything at all (i.e., only report failure when the backup process is determined to be a failure).

If operation 212 determines that the backup operation results of operation 206 do contain at least one backup operation failure, method 200 proceeds to operation 215, which determines whether the backup operation results meet a predetermined level of success. Depending on the embodiment, the predetermined level of success may be defined, for example, by a threshold percentage of backup operations successfully or unsuccessfully performed. For example, the threshold percentage could be set to require that at least 95% of backup operations to be successful in order for the backup process to meet the predetermined level of success. Hence, even if the backup operation results contain one or more failures, if at least 95% of all backup operations indicate success, the backup process would be determined to be a success. In another example, the threshold percentage could be set to require that at least 85% of all critical backup operations to be successful in order for the backup process to meet the predetermined level of success In other embodiments, the predetermined level of success may be defined by a reporting rule that assigns a weight value to a backup operation. Depending on the embodiment, the weight value may signify the backup operation's criticality to the backup process. In some such embodiments, at operation 215 method 200 may utilize the weight value provided in a reporting rule to determine whether a specific failed backup operation will contribute to a backup process meeting the predetermined level of success.

For example, where a reporting rule specifies a weight value for a backup operation A designating it as a critical backup operation, and another reporting rule specifies a weight value for a backup operation B designating it as a non-critical backup operation, if backup operation A were to fail, the backup process would impact whether the backup process meets or fails the predetermined level of success. If, however, backup operation A were successful and backup operation B were failed, then operation 215 could still determine the backup process to be a success because only backup operation A is of critical impact to predetermined level of success.

In certain embodiments, the backup reporting rule may be configured to assign the weight value to a backup operation according to a type of backup operation (e.g., copy, remove, create, etc.), a type of content within the data (e.g., cache files, databases, e-mail, images, etc.), or an identity of the backup client (i.e., backup operations performed on a specific backup client are critical to the overall backup process, when the backup process is being performed on two or more backup clients).

If method 200 determines that the one or more backup operation results from produced from the backup process successfully meet the predetermined level of success at operation 215, method 200 determined the backup process to be a success at operation 218.

However, if method 200 determines that the one or more backup operations fail to meet the predetermined level of success at operation 215, method 200 may proceed to the backup process failure at operation 224. Alternatively, in some embodiments, when method 200 determines that the one or more backup operation results fail to meet the predetermined level of success, method 200 may have a backup user or backup administrator to disposition the backup operation failures at operation 221. In some such embodiments, method 200 may request this disposition of the backup operation failure only when operation 215 determines that the backup operation results fail to meet the predetermined level of success and certain conditions for prompting are met. An example condition may include when a failed backup operation lacks a reporting rule to signify its importance to the overall backup process.

Figure 2B:
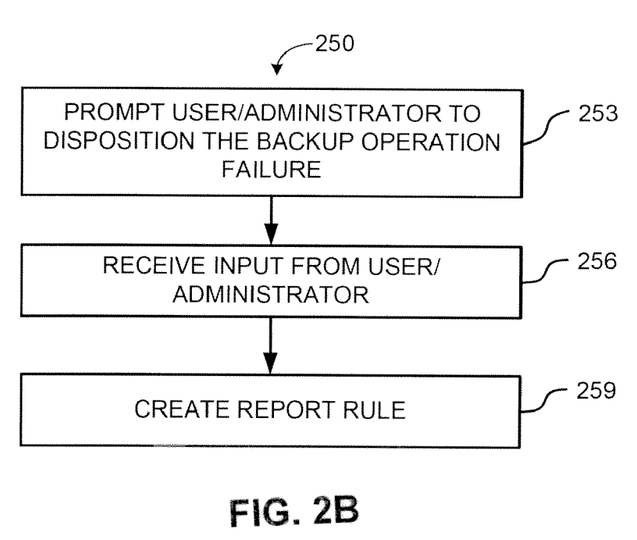

FIG. 2B provides a flowchart illustrating an example method 250 for dispositioning backup operation failures detected by an embodiment of the present invention. For example, method 250 may be performed by operation 221 of method 200, after operation 215 determines that the one or more backup operation results failed to meet a predetermined level of success. Referring now to FIG. 2B, method 250 begins at operation 253 when a backup user or backup administrator is prompted to disposition a backup operation failure. The prompting may comprise of displaying details regarding the failed back up operation in a graphical user interface (GUI), such as a window. In addition to the detail, the GUI may inquire whether the user/administrator wishes to disposition the failed backup operation, and wait for a response/input from the user administrator. Depending on the embodiment, method 250 may prompt the user/administrator with all the backup operation failures, regardless of their impact on the predetermined level of success. Alternatively, in other embodiments, operation 253 may prompt the user/administrator with only those failed backup operations that contribute to the backup process meeting the predetermined level of success, or prompt the user/administrator for only those failed backup operations that lack an associated reporting rule.

Subsequently, method 250 may receive an input from the user/administrator that dispositions the failed backup operation failure. For example, the user/administrator may disposition the failed backup operation as being critical to the overall backup process (e.g., assign the backup operation the highest weight value) and, as such, a contributor to the predetermined level of success. Conversely, in another example, the user/administrator may disposition the failed backup operation as non-critical to the overall backup process (e or assign the backup operation the lowest weight value) and, as such, not affecting whether a backup process meets the predetermined level of success.

In some embodiments, once the user/administrator has disposition one or more failed backup operations (or as the user/administrator dispositions the failed backup operations), method 250 may create one or more reporting rules associated with the one or more dispositioned backup operations. For example, in one embodiment, for example, may create a new reporting file associated with the failed backup operation, create a new database entry for a reporting rule associated with the failed backup operation, or modify an existing reporting rule associated with the failed backup operation.

Figure 3:
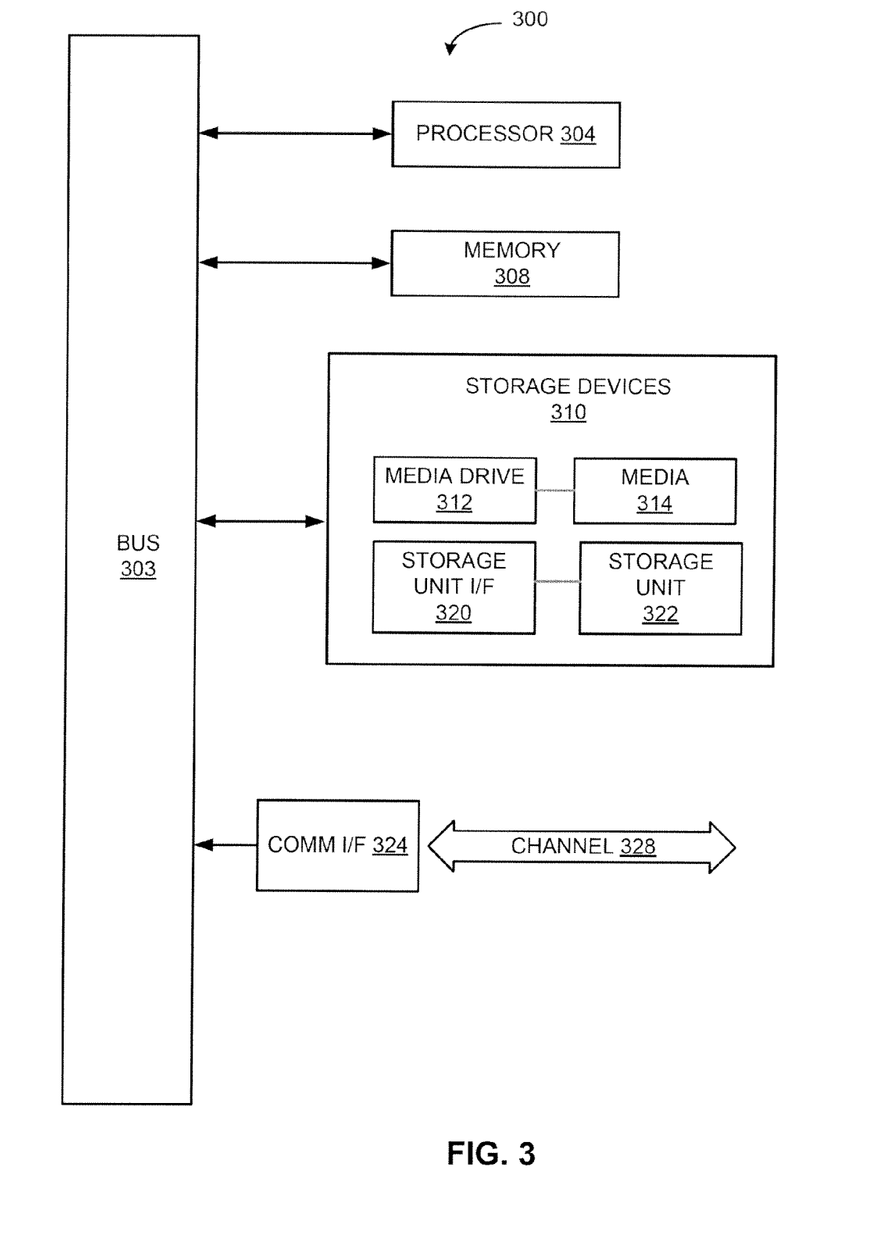
FIG. 3 is a diagram illustrating an example computing system with which aspects of the systems and methods described herein can be implemented in accordance with one embodiment of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 3. Various embodiments are described in terms of this example-computing module 300. After reading this description, it will become apparent to a person skilled in the relevant art how to implement the invention using other computing modules or architectures.

Referring now to FIG. 3, computing module 300 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the example illustrated in FIG. 8, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive an optical disk drive, a CD or DVD drive (R or RW), or other removable or fixed media drive might be provided. Accordingly, storage media 314, might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. These signals can deliver the software and data from memory or other storage medium in one computing system to memory or other storage medium in computing system 300. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 308, storage unit 320, and media 314. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "hut not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other Illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A backup server configured to administer a backup process on a backup client, comprising
   a processor;
   a memory connected to the processor; and a non-transitory computer readable medium having instructions embedded therein, the instructions configured to cause the processor to perform the operations of:
performing the backup process on the backup client, wherein the backup process comprises performing a plurality of backup operations on data residing on the backup client;
receiving a backup operation result for each of at least two backup operations of the plurality of backup operations performed to produce at least two corresponding backup operation results within a plurality of backup operation results, wherein each backup operation result indicates a success or failure for a corresponding backup operation;
prompting a user to assign a weight value to a performed backup operation corresponding to a backup operation result that indicates a failure, wherein the weight value signifies the performed backup operation's criticality to the backup process; and
determining a backup process result based on the at least two corresponding backup operation results, wherein if no backup operation result of the plurality of backup operation results indicates a failure, then the backup process result is determined to be a success, and wherein if a backup operation result of the plurality of backup operation results indicates a failure, then the backup process result is determined to be a success if the plurality of backup operation results meets the predetermined level of success.

2. The backup server of claim 1, wherein the weight value is used to determine an actual level of success for the backup process or a subsequent backup process.

3. The backup server of claim 1, wherein the instructions are further configured to cause the processor to perform the operations of:
receiving from the user the weight value assigned to the performed backup operation; and
creating a reporting rule that assigns the weight value to the performed backup operation.

4. The backup server of claim 1, wherein the user is prompted when the batch process result is determined to be a failure, when the performed backup operation is determined to be a failure, or when the performed backup operation is determined to be a failure and the performed backup operation lacks a weight value.

5. The backup server of claim 1, wherein the predetermined level of success is defined by a reporting rule that assigns a weight value to a backup operation, the weight value signifying the backup operation's criticality to the backup process and contributing to the predetermined level of success for the backup process or a subsequent backup process.

6. The backup server of claim 5, wherein the backup reporting rule assigns the weight value to a backup operation according to a type of backup operation, a type of content within the data, or an identity of the backup client.

7. The backup server of claim 1, wherein the predetermined level of success is defined by a threshold percentage of backup operations successfully or unsuccessfully performed.

8. The backup server of claim 1, wherein the predetermined level of success is defined by a threshold percentage of critical backup operations successfully or unsuccessfully performed.

9. The backup server of claim 1, wherein the data is a file or a database.

10. The backup server of claim 1, wherein the backup operation result indicates a failure when the backup operation corresponding to the backup operation result causes an error or tails to ever be attempted.

11. The backup server of claim 1, wherein performing the backup process comprises the backup server sending a remote instruction to the backup client to perform the backup process, wherein the backup client performs the plurality of backup operations on the data in response to the remote instruction.

12. The backup server of claim 11, wherein receiving the back up operation result comprises receiving the backup operation result from the backup client.

13. The backup server of claim 11, wherein receiving the back up operation result comprises the backup server recording the backup operation result.

14. The backup server of claim 1, wherein performing the backup process comprises the backup server performs the plurality of backup operations on the data, and wherein receiving the back up operation result comprises the backup server recording the backup operation result.

15. A backup client, comprising
a processor;
a memory connected to the processor; and
a non-transitory computer readable medium having instructions embedded therein, the instructions configured to cause the processor to perform the operations of:
receiving a remote instruction from a backup server to perform a backup process on the backup client, wherein the backup process comprises performing a plurality of backup operations on data residing on the backup client;
recording a backup operation result for each of at least two backup operations of the plurality of backup operations performed to produce at least two corresponding backup operation results within a plurality of backup operation results, wherein each backup operation result indicates a success or failure for a corresponding backup operation; and
transmitting the plurality of backup operations results to the backup server, wherein the backup server is configured to prompt a user to assign a weight value to a performed backup operation corresponding to a backup operation result that indicates a failure, wherein the weight value signifies the performed backup operation's criticality to the backup process, and to determine a backup process result based on the at least two corresponding backup operation results, wherein if no backup operation result of the plurality of backup operation results indicates a failure, then the backup process result is determined to be a success, and wherein if a backup operation result of the plurality of backup operation results indicates a failure, then the backup process result is determined to be a success if the plurality of backup operation results meets a predetermined level of success.

16. A backup client, comprising
a processor;
a memory connected to the processor; and
a non-transitory computer readable medium having instructions embedded therein, the instructions configured to cause the processor to perform the operations of:
performing a backup process on the backup client, wherein the backup process comprises performing a plurality of backup operations on data residing on the backup client;
recording a backup operation result for each of at least two backup operations of the plurality of backup operations performed to produce at least two corresponding backup operation results within a plurality of backup operation results, wherein each backup operation result indicates a success or failure for a corresponding backup operation;

prompting a user to assign a weight value to a performed backup operation corresponding to a backup operation result that indicates a failure, wherein the weight value signifies the performed backup operation's criticality to the backup process; and determining a backup process result based on the at least two corresponding backup operation results, wherein if no backup operation result of the plurality of backup operation results indicates a failure, then the backup process result is determined to be a success, and wherein if a backup operation result of the plurality of backup operation results indicates a failure, then the backup process result is determined to be a success if the plurality of backup operation results meets the predetermined level of success.

17. The backup client of claim 16, wherein the weight value is used to determine an actual level of success for the backup process or a subsequent backup process.

18. The backup client of claim 16, wherein the instructions are further configured to cause the processor to perform the operations of:

receiving from the user the weight value assigned to the performed backup operation; and creating a reporting rule that assigns the weight value to the performed backup operation.

19. The backup client of claim 16, wherein the user is prompted when the batch process result is determined to be a failure, when the performed backup operation is determined to be a failure, or when the performed backup operation is determined to be a failure and the performed backup operation lacks a weight value.

20. The backup client of claim 16, wherein the predetermined level of success is defined by a reporting rule that assigns a weight value to a backup operation, the weight value signifying the backup operation's criticality to the backup process and contributing to the predetermined level of success for the backup process or a subsequent backup process.

21. The backup client of claim 20, wherein the backup reporting rule assigns the weight value to a backup operation according to a type of backup operation, a type of content within the data, or an identity of the backup client.

22. The backup client of claim 16, wherein the predetermined level of success is defined by a threshold percentage of backup operations successfully or unsuccessfully performed.

23. The backup client of claim 16, wherein the predetermined level of success is defined by a threshold percentage of critical backup operations successfully or unsuccessfully performed.

24. The backup client of claim 16, wherein the data is a file or a database.

25. The backup server of claim 16, wherein the backup operation result indicates a failure when the backup operation corresponding to the backup operation result causes an error or fails to ever be attempted.

* * * * *

UNITED STATES PATENT AND TRADEMARK OFFICE
CERTIFICATE OF CORRECTION

| | |
|---|---|
| PATENT NO. | : 8,412,680 B1 |
| APPLICATION NO. | : 13/010734 |
| DATED | : April 2, 2013 |
| INVENTOR(S) | : Parag Gokhale et al. |

Page 1 of 1

It is certified that error appears in the above-identified patent and that said Letters Patent is hereby corrected as shown below:

In the Claims

Column 1, Line 67, Claim 10 "or tails to ever be attempted." should read --or fails to ever be attempted.--

Signed and Sealed this
Twenty-first Day of May, 2013

Teresa Stanek Rea
*Acting Director of the United States Patent and Trademark Office*